Aug. 31, 1965   E. SAMUELSEN   3,204,000
MANUFACTURE OF NITROTOLUENES
Filed Dec. 20, 1961
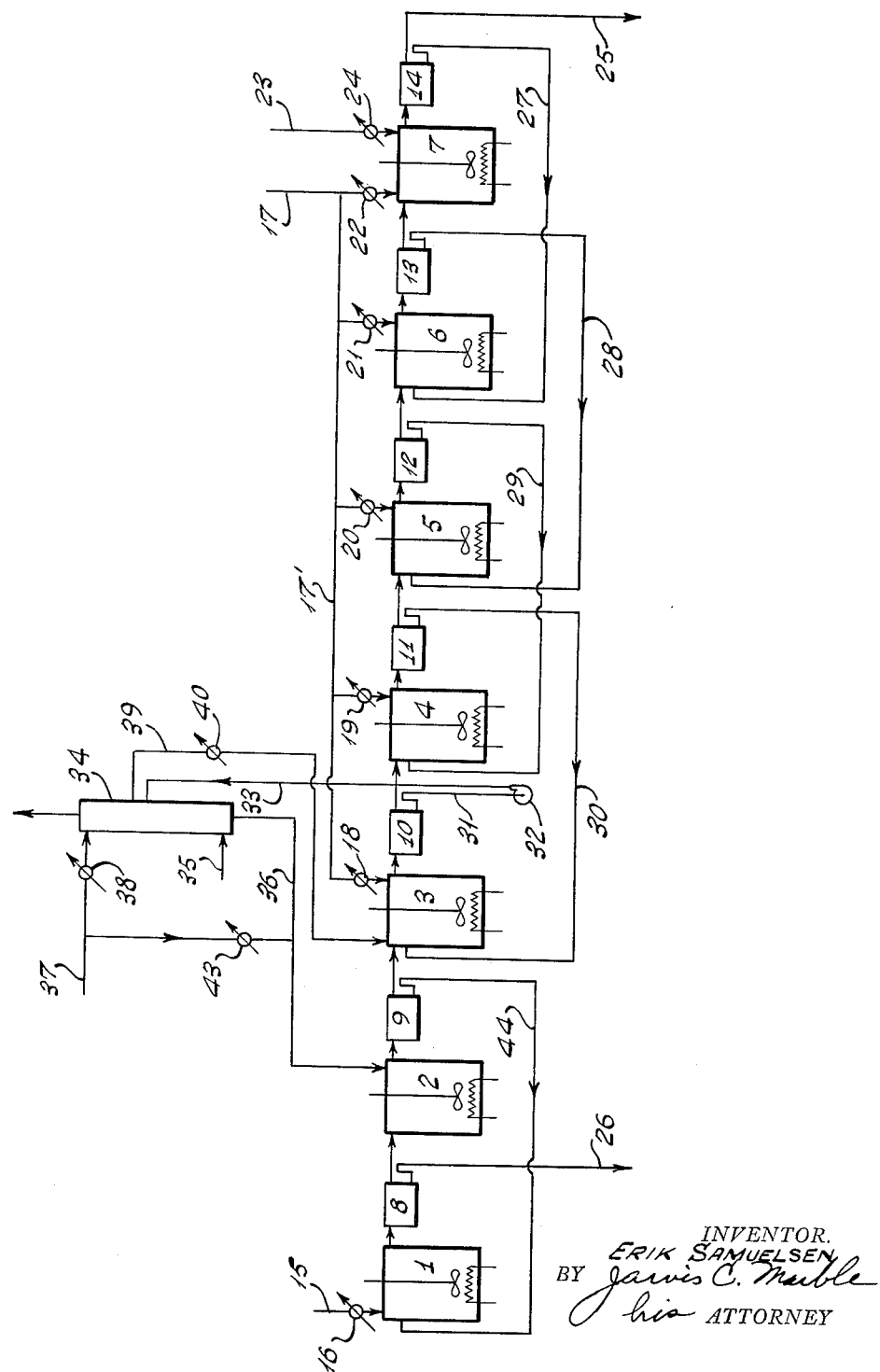
INVENTOR.
ERIK SAMUELSEN
BY Jarvis C. Marble
his ATTORNEY

# United States Patent Office 3,204,000
Patented Aug. 31, 1965

3,204,000
MANUFACTURE OF NITROTOLUENES
Eirik Samuelsen, Gullaug, Norway, assignor to Aktiebolaget Chematur, Stockholm, Sweden, a corporation of Sweden, and Norsk Spraengstofindustri A/S, Oslo, Norway, a corporation of Norway
Filed Dec. 20, 1961, Ser. No. 160,831
Claims priority, application Sweden, Dec. 22, 1960, 12,410/60
7 Claims. (Cl. 260—645)

This invention relates to nitration of toluene and, more particularly, to the continuous nitration of toluene to produce nitrotoluenes in counter-current manner with enhanced efficiency in the utilization of nitric acid and various oxides of nitrogen as formed or treated in the counter-current process and, particularly, at intermediate stages thereof.

As is well know, toluene can be nitrated into various nitrotoluenes such as, particularly, dinitrotoluene, trinitrotolene, and mixtures thereof, by feeding toluene in counter-current fashion with a nitration acid reactant through a series of reactors and separators. Thus, toluene may be fed into and through a series of reactors starting at one end thereof, while a nitration mixture of nitric acid with oleum or sulphuric acid, is fed in counter-current flow starting with the last reactor, with additional replenishment nitric acid introduced at one or more intermediate points in the apparatus to compensate for consumption of the nitrate radical during the nitration reaction. Since water is formed in the nitration reaction, it flows through the apparatus with the acid phase, which becomes more and more dilute and may be withdrawn at the beginning of the series of reactors as spent acid. Since the toluene and nitration acid reactants are traveling in counter-current flow, the toluene initially contacts the nitration acid mixture in relatively highly dilute form, and then successively contacts nitration acids having less and less water content. As the toluene proceeds through the reaction, nitration to an increasing extent is achieved, and the toluene material is finally withdrawn as dinitrotoluene or trinitrotoluene or mixtures thereof depending upon such factors as, for example, the number of individual reactors or nitration stages in series, the strength of the nitration acid reactant, etc.

Although the foregoing type of nitration reaction is well known, some difficulties may be experienced in the optimum efficient use thereof in commercial operations and arising, perhaps, from a variety of factors. For example, under conventional conditions of operation, there is inevitably some oxidation of the nitrated materials formed, which, of course reduces the ultimately desired yield of nitrotoluenes. Although it is possible, according to conventional techniques, to reduce quite substantially undesired oxidation of trinitrotoluene, as by a suitable choice of the acid composition of the nitration acid reactant, still a substantial amount of oxidation of dinitrotoluene of perhaps about 3% may be found or considered inevitable or unavoidable in the system. As a result of such oxidation, relatively large quantities of nitrous acid may be formed, particularly in the reactors or reaction stages where dinitrotoluene concentration is high (e.g., particularly in the first trinitration stage), so that the nitration acid reactant leaving the first trinitration stage and flowing in counter-current fashion through the apparatus enters the mononitration reactor or stage with a relatively and perhaps undesirably high content of nitrous acid.

If the mononitration stage is conducted under conditions where a relatively high water content (perhaps about 30%) is present in the nitration acid reactant, as may be necessary or desired for a variety of reasons, some further difficulties or inefficiencies may be introduced into the overall continuous process. Even if some substantial dilution takes place prior to or in the mononitration stage, with or without some partial expulsion or withdrawal of nitrous oxides, still the mononitration step may be performed with a relatively high content of nitrous acid in the nitration acid reactant mixture. Particularly under such conditions, nitrous acid has a pronounced affinity for or ability to remove nitric acid effectively from availability for toluene nitration. Thus, nitrous acid combines quite readily, although reversibly, with nitric acid in equimolar proportions to give $N_2O_4$ and water.

If it is attempted to compensate for such reaction by increasing the nitric acid content, it may be found necessary to interject sufficient extra nitric acid into the system to maintain a ratio of nitric acid to nitrous acid at above about 1:3 in order, for example, to avoid undesired side reactions giving a discolored nitrotoluene product, acid attack on even stainless steel as the composition of the nitrating acid reactant is changed, etc. Such attempts or factors also further increase the nitric and nitrous acid concentrations in the spent acid and without a commensurate increase in nitrotoluene yield or efficiency, particularly when such concentrations are sufficiently high in the spent acid to warrant or even necessitate the denitration thereof to recover nitrogen components. Similarly, it may be found that the cumulative effect of maintaining higher concentrations of nitric acid, with increased oxidation and production of nitrous acid, engenders a situation which is more disadvantageous than merely being inefficient. For example, with higher contents of nitrous acid or nitrous oxide gases, there may be readily achieved a danger point of considerable risk of explosions in the apparatus arising from gas phase reactions between evaporated toluene and the nitrous gases.

According to this invention, by contrast, there is provided for the continuous counter-current nitration of toluene through a plurality of reaction stages with a nitration acid reactant to form the desired nitrotoluenes with enhanced yields or efficiencies and without undesired or excessive formation or accumulation of nitrous acid, particularly in the mononitration stages, as by withdrawing nitration acid reactant from intermediate stages of the process such as the dinitration stage and removing nitrous acid therefrom before returning the acid reactant to the process at, for example, the mononitration stages thereof. As a further feature of this invention, there is provided for such intermediate removal of nitrous acid under such conditions of reaction that it is converted to nitric acid and/or used to fortify the nitric acid content of the primary nitration acid reactant.

With the foregoing and additional objects in view, this invention will now be described in somewhat more detail, and other objects and advantages thereof will be apparent from the following description, the accompanying drawing, and the appended claims.

In the drawing there is indicated a diagrammatic or schematic flow sheet type of representation of a combination of apparatus and process embodying and for practicing this invention.

Referring to the drawing, there is indicated a plurality of nitration reactors or nitrators 1–7 of conventional and well understood design and each indicated as being equipped with a conventional agitator and a temperature regulating device. Adjacent to each nitrator 1–7 and arranged in flow communication with the outlets thereof are separators 8–14, also of conventional and well understood design and provided for the settling and separation of an upper nitrated toluene phase from a lower acid reactant phase from the effluent mixture or emulsion received by each of the separators 8–14 from its respective nitrator 1–7 and prior to introduction of the nitrotoluene phase into the next successive nitrator. Toluene starting material to be nitrated is introduced into the first nitrator 1 through feed line 15 and preferably under the control of a flowmeter device indicated at 16, and is fed successively through the various nitrators 1–7 and interposed separators 8–14 to be finally withdrawn, in the illustrated embodiment as trinitrotoluene, from the last separator 14 through product line 25.

For counter-current flow through the series of nitrators in a direction opposite to that of the toluene material, concentrated nitric acid is introduced through feed line 17 into the final nitrator 7 and preferably under the control of a flowmeter indicated at 22. Similarly, as may be desired for replenishment of the nitric acid reactant as the nitration reaction progresses, additional introductions of concentrated nitric acid may also be made into each of the intermediate nitrators 3–6, as from manifold nitric acid feed pipe 17' and as controlled by the flowmeters indicated at 18–21 for the respective intermediate nitrators. The sulphuric acid or oleum component of the nitration acid reactant are indicated as being introduced first into nitrator 7 through feed line 23 and as controlled by flowmeter 24 for counter-current flow through the series of nitrators, to leave the apparatus as spent acid through line 26 after separation from the toluene phase in separator 8. In the illustrated embodiment, for convenience of explanation, nitrators 1 and 2 may be considered as indicating the mononitration stage, while nitrator 3 is the first of the dinitration stages, with continued successive nitration to trinitrotoluene in the subsequent nitrators to form the final product leaving the system through line 25. As will be apparent from the foregoing, toluene entering the first nitrator 1 contacts the most dilute or weakest nitration acid reactant and is partially nitrated to mononitrotoluene. The resulting mixture of acid and hydrocarbon phases is allowed to settle and is separated in separator 8, from which the spent acid is withdrawn from the lower layer through line 26 while the partially nitrated toluene continues into nitrator 2 where mononitration is completed, after which the hydrocarbon and acid reactant phases are again separated in separator 9 and the nitrated toluene introduced into the next succeeding nitrator 3 for further nitration therein, and so forth.

Also as indicated, the nitration acid reactant, consisting primarily of sulphuric acid with the desired additional components of nitric acid and such water as may be present or formed during the reaction, passes similarly through the apparatus in the opposite or counter-current direction. Thus, the acid reactants originally introduced into the last nitrator 7 are separated in separator 14, after completing the nitration of the toluene materials, and are withdrawn as a bottom layer from separator 14 through line 27 to be introduced into nitrator 6 along with partially nitrated hydrocarbon for reaction therein. The effluent from nitrator 6 is separated in separator 13 into hydrocarbon and acid reactant phases, with the latter being withdrawn from the lower layer of separator 13 through line 28 to be introduced into nitrator 5 for reaction therein. Acid reactant withdrawn from separator 12 is simularly led through pipe 29 to be introduced for reaction in nitrator 4, from the effluent of which the acid reactant is separated in separator 11 and withdrawn through line 30 to be introduced for reaction in nitrator 3. As noted, the nitric acid content of the counter flowing nitration acid reactant is replenished as necessary with fresh nitric acid for reaction in each of the reactors 3–6 and to be admixed with the nitration acid reactant phase withdrawn from each of the separators 10–13.

As noted, although the undesired oxidation of the trinitrotoluene product in the later stages of the reaction can be satisfactorily minimized by suitable choice of composition or proportion ratios of the nitration acid reactant in each stage, as well understood, substantial oxidation of dinitrotoluene occurs in the dinitration stages such as, particularly, nitrator 3 in the illustrated system and resulting in an undesired or excessive accumulation or concentration of nitrous oxide in the nitration acid reactant phase separated in separator 10 and withdrawn from the lower layer thereof through line 31. According to this invention, such acid reactant phase and the substantial concentration of nitrous acid therein is not introduced directly into another nitrator, but is instead introduced through pump 32 and line 33 into a stripping column 34, at a temperature of the order of 70° C., for the removal of nitrous acid from the nitration acid reactant. Such nitrous acid removal is satisfactorily effected in accordance herewith by a variety of well understood means such as, for example, aeration by blowing air upwardly through column 34 from air inlet 35 and dilution or stripping with dilute nitric acid (about 55–60% by weight solution) introduced to the top of stripping column 34 through line 37 and under the control of flowmeter 38.

As will be apparent from the foregoing, nitrous acid originally present in the mixture introduced into stripping column 34 from line 33 is converted to gaseous nitric oxides which are normally exhausted to the atmosphere through the top of column 34 at the prevailing temperatures of operation thereof. The originally introduced mixture from line 33 thus leaves column 34 through pipe 36 as diluted nitric acid and nitration acid reactant, substantially free of nitrous acid and gaseous nitric oxides, and is introduced from line 36 into nitrator 2 for reaction therein with the partially nitrated toluene in the mononitration stage. As indicated, this dilute reactant may be further admixed with dilute nitric acid after leaving stripping column 34 and prior to introduction into nitrator 2, as by line 42 controlled by flowmeter 43. Thereafter, the reaction products from nitrator 2 are separated in separator 9, with the nitration acid phase being withdrawn from the lower layer through line 44 for introduction into nitrator 1 to contact entering toluene. Then the resulting reaction mixture from nitrator 1 is separated, as previously noted, in separator 8, with the spent acid phase being withdrawn through line 36 as waste reactant.

If desired and as a further means for enhancing the total efficiency of the materials and of the entire system or process, stripping column 34 may be provided of such length, in known manner, that complete stripping of nitrous acid from the mixture introduced through line 33 occurs in only the lower portion of the column. If, then, the dilute nitric acid solution introduced into column 34 through line 37 is introduced a substantial distance of column lengths above inlet 33, all or a relatively large proportion of nitric acid fumes formed in the lower portion of column 34 may be absorbed or dissolved by the entering dilute nitric acid in the upper portion of column 34 so that a portion of the thus fortified nitric acid may be withdrawn from column 34 as through take off 39 and used directly, preferably under the control of flowmeter 40, as make up or replenishment of nitric acid for introduction into nitrator 3, for example, or others of the nitrators at points in the reaction where the nitric acid concentration of the nitration acid reactant is commensurate with the concentration of the solution withdrawn at 39—i.e., the originally dilute 55–60% acid in line 37 as fortified or made more concentrated by the nitric acid fumes it has dissolved in the upper portion of column 34. As will also be understood, whether or not reabsorption of nitric oxide is provided in the upper portion of column 34, it may be advantageous to cool the top portion of the column, in known manner, as with water jackets, circulation of coolant through tubes, or withdrawing and recycling a portion of the dilute acid after cooling in a heat exchanger apart from the column, all in known and well understood manner.

As illustrative of satisfactory results in accordance with the illustrated embodiment and as emphasizing the enhanced advantages and efficiencies of operation in accordance with this invention, there are noted in Table I below various data indicating the varying composition or proportions of the nitration acid reactant at various points through a system comprising essentially the apparatus just described but without the intermediate removal of the acid phase between nitrators 2 and 3 and without the stripping or removal therefrom of nitrous acid accumulated or formed therein. With these data of Table I are to be compared the data set forth in Table II, obtained from a comparable processing under the same operating conditions except that the Table II relates to an arrangement in accordance with this invention in which there was intermediate stripping and removal of nitrous oxide from the nitration acid reactant withdrawn from the dinitration step as indicated. All the figures given are percentages by weight.

TABLE I

| Nitrator No. | 1 | 2 | 3 | 4 | 5 | 6 | 7 |
|---|---|---|---|---|---|---|---|
| Sulphuric Acid | 66.4 | 69.5 | 83.0 | 86.6 | 87.0 | 87.0 | 88.0 |
| Nitric Acid | 1.2 | 2.0 | 2.0 | 6.0 | 10.5 | 14.4 | 16.0 |
| Nitrous Acid | 3.3 | 3.5 | 6.9 | 6.9 | 2.5 | 0.6 | |
| Water | 29.1 | 25.0 | 9.0 | 1.0 | | —2 | —4 |

TABLE II

| Nitrator No. | 1 | 2 | 3 | 4 | 5 | 6 | 7 |
|---|---|---|---|---|---|---|---|
| Sulphuric Acid | 68.9 | 71.6 | 81.4 | 87.1 | 87.2 | 87.5 | 88.0 |
| Nitric Acid | 0.5 | 3.0 | 4.0 | 6.0 | 10.9 | 14.2 | 16.0 |
| Nitrous Acid | 0.3 | 0.4 | 5.6 | 5.9 | 1.9 | 0.3 | |
| Water | 30.3 | 25.0 | 9.0 | 1.0 | | —2 | —4 |

As will be noted from the foregoing, the intermediate stripping of nitrous acid has the effect of generally reducing the undesired nitrous acid contents in the process, even beyond the actual point of stripping and in view of the continuous and counter-current nature thereof. More emphatically, however, comparison of the foregoing data indicates that the nitric and nitrous acid content of the spent acid reactant leaving nitrator 1 through separator 8 in line 26 is so low as not to require the additional steps of processing or apparatus for denitrating the spent acid or recovering the nitric oxide components thereof, as would be an indicated economic desirability or necessity with prior or conventional operations with which, as indicated in Table I, the "spent" reactant emerging from a complete process still contained as much as 1.2% nitric acid and as much as 3.3% nitrous acid, promptly after the formation thereof by oxidation of dinitro toluene and prior to continued or subsequent introduction of the acid reactant to additional nitrating stages in which a substantial nitrous acid content may produce the disadvantages dicussed previously in various aspects of the desired toluene nitration reaction.

Furthermore, satisfactory results have been achieved in accordance with this invention as producing additionally enhanced advantages and efficiencies with a toluene nitration process of the character described and attributable to the recovering of nitric acid fumes by reabsorption in the top of the stripping column 34. Thus, if the various nitrogen oxide fumes are recovered (after suitable aeration or other oxidation to nitric oxide) in dilute solution, as indicated in the upper portion of column 34, the dilute nitric acid thus obtained is available, as noted, as make up or replenishment acid for the nitration reactant. If normally and conventionally exhausted nitrogen oxide fumes from all of the various nitrators 1–7 are similarly converted to nitric oxide and recovered in an aqueous absorption system to form usable dilute nitric acid, even further economies may be realized. For example, satisfactory results have been achieved in accordance herewith in the use and re-use of such recovered dilute nitric acid quantitatively as replenishment in various stages of the process so that only about 500–550 kg. of 98% concentrated nitric acid was required to be introduced originally through line 17 for the production of as much as 1000 kg. pure trinitrotoluene. That is, the remainder of the nitric acid necessary for such nitration need not be as concentrated as the 98% acid introduced originally, and may be considered as the equivalent of 750–800 kg. of 60% nitric acid for replenishment, much of which can be readily provided by the dilute acid introduced through line 37 and, especially, if the concentration thereof is enhanced or fortified by absorbing otherwise wasted or exhausted nitric oxide and aerated nitrous oxide fumes as indicated. Furthermore, as well understood, since 60% nitric acid is not considerably cheaper (for the same $HNO_3$ content) than 98% nitric acid, considerable further economies may be achieved in accordance hereinwith, both from the recovery for re-use of otherwise wasted or useless nitrous acid and from the fact that the intermediate stripping of nitrous acid in accordance herewith reduced the requirement of very strong or concentrated nitric acid to provide the desired nitration in the earlier stages of the reaction and/or compensate for the presence of the nitrous acid in the first place.

As will be apparent from the foregoing, there is provided in accordance with this invention a system or arrangement of apparatus and process steps for the nitration of toluene to produce various nitrated products as desired in continuous and counter-current manner and with substantially enhanced advantages and efficiencies of material utilization, etc. Not only is the required proportion of highly concentrated nitric acid substantially and economically reduced, but also the undesired or excessive formation or accumulation of nitrous acid is avoided by the intermediate stripping thereof from the counter flowing acid reactant phase and notwithstanding the fact that inevitable oxidation in the denitration step is neither avoided nor appreciably diminished. Similarly, not only are the conventional difficulties and inefficiencies attributable to high nitrous acid concentration eliminated in the early nitration stages, but also the conventional waste of nitric acid usable for the desired nitration reaction is compensated for to produce increased efficiency by recovering for re-use otherwise wasted nitric and nitrous oxides and the utilization thereof as absorbed in dilute nitric acid at particular stages in the process where the dilute concentration of the recovered product is commensurate with the prevailing nitric acid concentration in any event to reduce further the proportion of highly concentrated nitric acid conventionally required, while also completely eliminating the necessity for extra denitrating or recovery steps or apparatus for the spent acid effluent to recover or avoid wasting the nitrogen components thereof.

The invention is illustrated by the following examples in which the parts are parts by weight for the production of 1,000 parts of purified TNT.

*Example 1*

In a system comprising 7 nitration reactors, 7 separators, and one stripping column interconnected as indicated in the accompanying drawing, and with the functions of the individual units substantially as described above, the nitration of toluene to trinitrotoluene is carried out by continuously feeding into the system the following quantities of reactants:

450 parts of toluene, through line 15
1110 parts of nitric acid of 60% strength, through line 37
575 parts of nitric acid of 98% strength, through line 17
1535 parts of oleum with 25% free $SO_3$, through line 23

The dilute nitric acid is distributed as follows:

840 parts through flowmeter 38
270 parts through flowmeter 43

The concentrated nitric acid is distributed as follows:

90 parts through flowmeter 19
86 parts through flowmeter 20
34 parts through flowmeter 21
365 parts through flowmeter 22

Concentrated nitric acid is added to nitrator 3 through flowmeter 18 only during a starting up period.

From the upper part of column 34, 307 parts of a somewhat fortified nitric acid, of strength approximately 78%, i.e. the equivalent of 245 parts of 98% nitric acid, are withdrawn through line 39 and fed to reactor 3 for replenishment. The acid reactant phase withdrawn from separator 10 is fed to the column 34 through line 33 with a temperature of approximately 70° C., which is the reaction temperature maintained in reactor 3.

Through inlet 35 air is blown into the bottom of column 34 at a rate of approximately 4000 cm. ft. per 1000 lbs. TNT produced. The aerated mixture drawn off at the bottom of column 34 is as a whole fed into reactor 2 through line 36.

With the quantities of reactants here stated, operating conditions in the nitration reactors are characterized by the composition of the acid reactants being substantially as given in the Table II above, provided the temperatures in the different nitration reactors are approximately as follows:

| Nitrator No. | 1 | 2 | 3 | 4 | 5 | 6 | 7 |
|---|---|---|---|---|---|---|---|
| Temperature, °C. | 40 | 50 | 70 | 80 | 87 | 92 | 100 |

The operating conditions of the column 34 is further characterized by the following compositions, apart from the content of some nitrated toluene, of the nitration acid reactant flowing through it:

|  | In the feed line 33 | In the effluent line 36 |
|---|---|---|
| $H_2SO_4$ | 81.4 | 71.0 |
| $HNO_3$ | 4.0 | 6.8 |
| $HNO_2$ | 5.6 | 0.3 |
| $H_2O$ | 9.0 | 21.9 |

The figures are percentages by weight.

*Example 2*

In a system substantially as described in Example 1, a supplementary line, with a flowmeter, not shown in the drawing, is provided for introducing dilute nitric acid, of 60% strength, into nitrator 7. Oleum with 40% free $SO_3$ is now substituted for the one with 25% free $SO_3$ mentioned in Example 1. Whereas the toluene feed is unchanged, the following quantities of acid reactants are fed into the systems:

1,222 parts of nitric acid of 60% strength
500 parts of nitric acid of 98% strength
1,490 parts of oleum with 40% free $SO_3$ Hence the distribution of the dilute nitric acid now is:

840 parts through flowmeter 38
270 parts through flowmeter 43
122 parts directly to reactor 7

The distribution of the concentrated nitric acid is correspondingly altered to:

90 parts through flowmeter 19
86 parts through flowmeter 20
34 parts through flowmeter 21
290 parts through flowmeter 22

The operating conditions in the system are completely the same as in Example 1, the only difference is that the quantity of concentrated nitric acid required for the process is further decreased by the use of a stronger oleum, with corresponding increase in the amount of dilute nitric acid utilized.

Still other ratios between the amounts of concentrated and dilute nitric acid may be experienced by the use of sulphuric acid or oleums of different strengths, as well as by altering the proportions of the sulphuric acid feed to the feed of toluene, provided that the operating conditions in the individual nitrators and in the stripping column are not caused to deviate too much from those set forth in these examples.

What is claimed is:

1. In a process for the nitration of toluene by counter-current contact with a nitration acid reactant including nitric acid, the steps which comprise passing said nitration acid reactant through a plurality of reaction stages in counter-current flow with said toluene for nitration thereof to dinitrotoluene and trinitrotoluene progressively in said stages, producing water and nitrous acid in at least one of said stages where dinitrotoluene is present and resulting from reactions therein, the proportions of water and nitrous acid in said nitration acid reactant increasing as said reactant proceeds through said successive stages, withdrawing from said reaction between two of said successive stages where dinitrotoluene is present said nitration acid reactant with said nitrous acid therein, removing said nitrous acid from said withdrawn reactant and converting it to nitric acid, and returning said thus treated nitration acid reactant to said process for further nitration of said toluene therein substantially free of nitrous acid.

2. In a process for the nitration of toluene by counter-current contact with a nitration acid reactant including nitric acid, the steps which comprise passing said nitration acid reactant through a plurality of reaction stages in counter-current flow with said toluene for nitration thereof to dinitrotoluene and trinitrotoluene progressively in said stages, producing water and nitrous acid in at least one of said stages where dinitrotoluene is present, withdrawing from said dinitrotoluene stage said nitration acid reactant with said nitrous acid therein, removing said nitrous acid from said withdrawn nitration acid reactant by conversion to nitric acid fumes, and returning said thus treated nitration acid reactant to said process at a point therein ahead of said dinitrotoluene stage for further nitration of said toluene therein substantially free of nitrous acid.

3. In a process for the nitration of toluene by counter-current contact with a nitration acid reactant including nitric acid, the steps which comprise passing said nitration acid reactant through a plurality of reaction stages in counter-current flow with said toluene for nitration thereof to dinitrotoluene and trinitrotoluene progressively in said stages, producing water and nitrous acid in at least some of said stages where dinitrotoluene is present, withdrawing from said reaction at said dinitrotoluene stages thereof said nitration acid reactant with said nitrous acid therein, aerating said withdrawn nitration acid reactant and diluting it with dilute nitric acid for removing said nitrous acid therefrom, and returning said thus treated nitration acid reactant to said process for further nitration of said toluene therein substantially free of nitrous acid.

4. In a process for the nitration of toluene by counter-current contact with a nitration acid reactant including nitric acid, the steps which comprise passing said nitration acid reactant through a plurality of reaction stages in counter-current flow with said toluene for nitration thereof progressively in said stages, producing water and nitrous acid in at least some of said stages where dinitrotoluene is present and resulting from said reactions therein, withdrawing from said reaction at said dinitrotoluene stages said nitration acid reactant with said nitrous acid therein, removing said nitrous acid from said withdrawn reactant by conversion to nitric acid fumes, returning said thus treated nitration acid reactant to said process for further nitration of said toluene therein substantially free of nitrous acid, absorbing said nitric acid fumes from said reactant in aqueous nitric acid, and introducing said aqueous nitric acid into said process as replenishment for said nitration acid reactant consumed during said nitration reactions.

5. A process as recited in claim 4 in which said removing of said nitrous acid from said reactant is accomplished by aerating said reactant in the presence of dilute aqueous nitric acid for oxidation of said nitrous acid to nitric oxide and then absorbing said nitric oxide into another portion of said dilute nitric acid.

6. A process as recited in claim 5 in which said removing and aeration steps are conducted with counter-current flow of said dilute nitric acid and said aerating air through said nitrous acid in said nitration acid reactant in a stripping column.

7. A process as recited in claim 6 in which said withdrawn nitration acid reactant is introduced to said stripping column below the top portion thereof for said aeration of nitrous acid and in which said dilute nitric acid is introduced into said column at the top thereof for said absorption of nitric oxide fumes and is then withdrawn from said column above the point at which said nitration acid reactant is introduced into said column.

References Cited by the Examiner
UNITED STATES PATENTS

| | | | |
|---|---|---|---|
| 1,337,106 | 4/20 | Thomson | 23—159 |
| 2,543,446 | 2/51 | Egly | 23—157 |

FOREIGN PATENTS 624,748   8/61   Canada.

CARL D. QUARFORTH, *Primary Examiner.*

OSCAR R. VERTIZ, LEON D. ROSDOL, REUBEN EPSTEIN, *Examiners.*